United States Patent [19]

Berger et al.

[11] Patent Number: 5,526,421
[45] Date of Patent: Jun. 11, 1996

[54] VOICE TRANSMISSION SYSTEMS WITH VOICE CANCELLATION

[76] Inventors: Douglas L. Berger, 9211 Arbor Branch, Dallas, Tex. 75243; Donald G. Jones, 4205 Cannon Ave., Vernon, Tex. 76384

[21] Appl. No.: 18,277

[22] Filed: Feb. 16, 1993

[51] Int. Cl.⁶ .................................................. H04B 15/00
[52] U.S. Cl. .......................... 379/389; 379/388; 379/433; 379/390; 379/410
[58] Field of Search ..................................... 379/410, 392, 379/390, 433, 388, 387, 389; 381/71, 94, 72, 92

[56] References Cited

U.S. PATENT DOCUMENTS

| | | | |
|---|---|---|---|
| 4,654,871 | 3/1987 | Chaplin et al. | 381/94 |
| 4,769,847 | 9/1988 | Taguchi | 381/94 |
| 4,815,139 | 3/1989 | Ericksson et al. | 381/71 |
| 4,850,016 | 7/1989 | Groves et al. | 379/433 |
| 4,876,722 | 10/1989 | Dekker et al. | 381/71 |
| 5,033,082 | 7/1991 | Ericksson et al. | 379/388 |
| 5,182,774 | 1/1993 | Bourk | 381/71 |
| 5,216,721 | 6/1993 | Melton | 381/71 |

*Primary Examiner*—Jeffery Hofsass
*Assistant Examiner*—Jacques M. Saint-Surin
*Attorney, Agent, or Firm*—Gary C. Honeycutt

[57] ABSTRACT

A voice transmission system including a microphone (13) in combination with active sound cancellation means comprising a speaker (14) and a signal processor (17) for generating a mirror-image waveform with respect to the signal generated when speaking into the microphone. The mirror-image waveform is used to activate the speaker (14) thereby cancelling the user's voice. This provides the user with complete privacy, since the cancellation prevents the user's voice from being overheard by others, even in a crowded area.

6 Claims, 3 Drawing Sheets

PORTABLE VERSION

VOICE TRANSMISSION SYSTEMS WITH VOICE CANCELLATION

This invention relates to voice transmission systems equipped with means for active sound cancellation, so that a person's voice cannot be overheard as he or she speaks into a transmitter or microphone, such as the mouthpiece of a telephone.

BACKGROUND

It is well known that active noise cancellation is achieved by the electronic synthesis of an antinoise signal having the same frequency and amplitude as the noise, but 180 degrees out of phase, and then using the synthetic signal to generate and transmit an acoustic wave that mixes with the noise, so that the sum of the two waveforms approaches zero, thereby generating silence.

The basic components of an antinoise system include a microphone or transducer to monitor the noise source, and a signal processor to receive the noise signal and generate an antinoise signal having a mirror-image waveform. The antinoise signal is then passed to one or more speakers or transducers for generating the acoustic wave used to cancel the noise. In addition there is a synchronizing input which generates and feeds a correction signal to the processor, and an adaptor for constantly changing the cancellation signal to match a constantly changing noise signal.

The entire history of active sound cancellation has been directed to noise control, and to the filtering of unwanted sounds from speech transmission. For example, the radio receiver headset of an airline pilot has been equipped with means for cancelling background noise, so that the pilot hears noise-free voice reception. Such a device is described in U.S. Pat. No. 4,654,871. The patent also describes the addition of a noise cancellation signal to a transmitted voice signal that includes background noise, with the result that a noise-free signal is transmitted.

SUMMARY OF THE INVENTION

A voice transmission system is provided with active sound cancellation means, for silencing the sound of user's voice immediately after the voice transmitter of the system converts the acoustical voice wave to an electronic signal. This provides the user with privacy in a crowded area where his or her voice would otherwise be readily overheard. In many office areas, for example, several people may be using a telephone at the same time with no partition or other separation between adjacent users. Not only will the invention provide individual privacy for each user, but it will also reduce or eliminate the cumulative effect (noise) created by many simultaneous voices in a crowded area.

But noise control is not the real object of the invention. This concept differs sharply from noise cancellation in that a single user's voice is not noise. The user's entire acoustical voice wave is cancelled; but not until the voice wave has reached the microphone, or the telephone mouthpiece and is converted therein to an electronic signal for transmission to a remote listener. Thus, the timing of the cancellation must be just after the electronic voice signal is generated.

The electronic voice signal is then divided for simultaneous transmission to a remote listener, and also to a data processor for the synthesis of a cancellation waveform. Since electronic signals travel nearly a million times faster than acoustic waves in air, the cancellation waveform can be generated and fed to an electro-acoustic transducer/speaker near the user's mouth for acoustical cancellation of the voice wave before it travels an inch beyond the telephone mouthpiece.

One embodiment of the invention comprises a microphone or other voice transmitter in combination with active sound cancellation means for attenuating or silencing a user's voice immediately after it is converted to an electronic signal.

Another embodiment comprises a telephone or radio system having a transmitter or microphone and a receiver, in combination with active sound cancellation means for acoustically attenuating or cancelling a user's voice just after it is converted to an electronic waveform by the microphone. The sound cancellation means includes a circuit for dividing the electronic signal, such that it can be transmitted to a remote receiver and simultaneously processed for the synthesis of a voice cancellation waveform. The synthetic waveform is then passed to a transducer or speaker near the microphone for the generation of an acoustic wave to cancel or attenuate the user's voice.

DETAILED DESCRIPTION OF THE INVENTION

Figure 1:
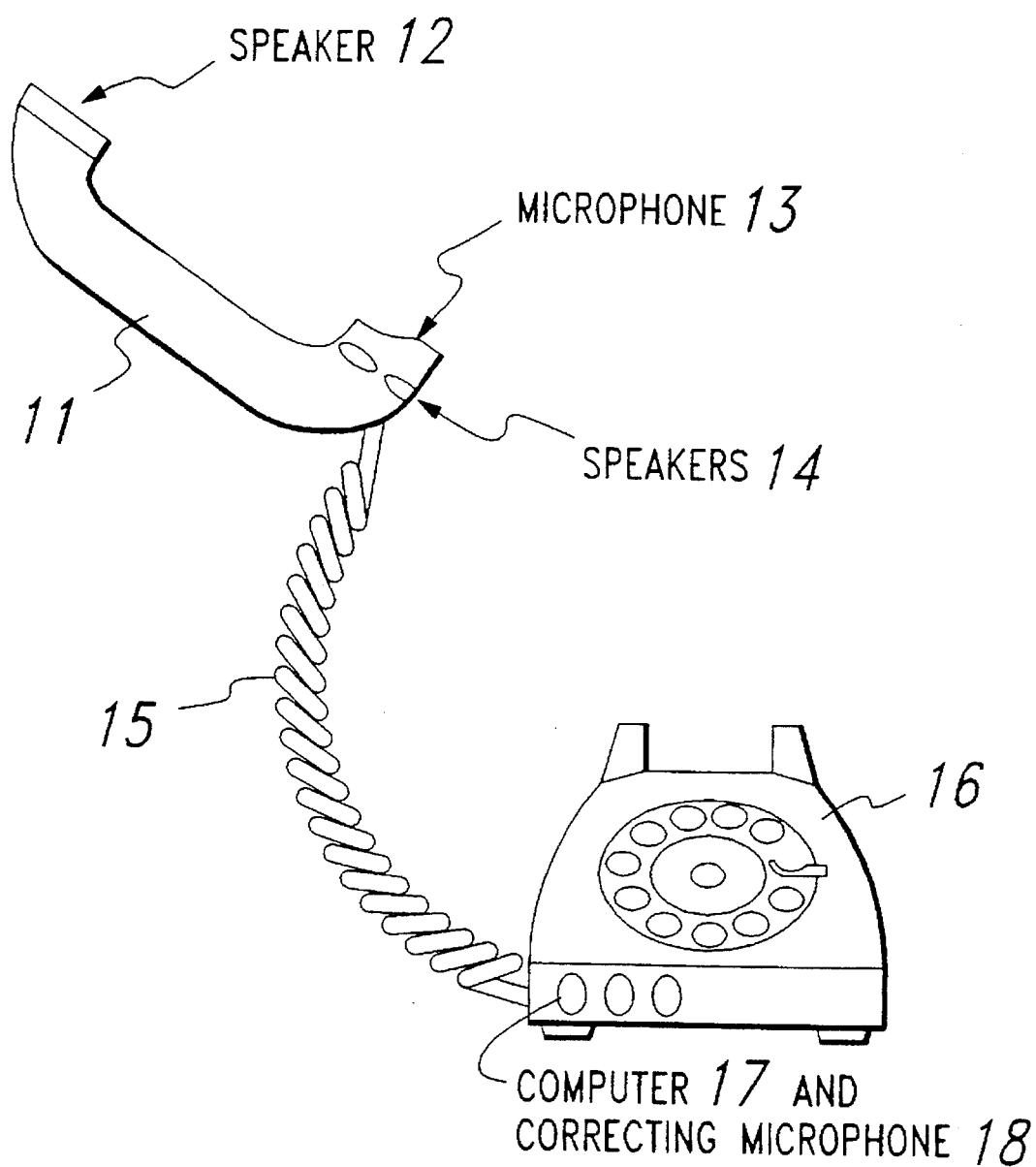
FIG. 1 is a pictorial view of a telephone system illustrating one embodiment of the invention.

Shown in FIG. 1 is a telephone system including hand set 11 having an earpiece 12, a microphone 13, and one or more voice cancellation speakers 14. The cancellation speakers must be located at a distance from the user's mouth which exceeds the distance between the user's mouth and the transducer within the microphone. For example, the cancellation speakers are located about 1 to 6 inches from the mouthpiece transducer.

The electronic waveform generated by the microphone is then passed through cord 15 to base set 16 where it is divided for transmission to a remote receiver and for simultaneous processing by computer 17, which also receives a correcting signal from microphone 18. The synthetic waveform generated by the computer is then passed through a separate line in cord 15 back to speakers 14 for acoustic cancellation of the user's voice.

Figure 2:
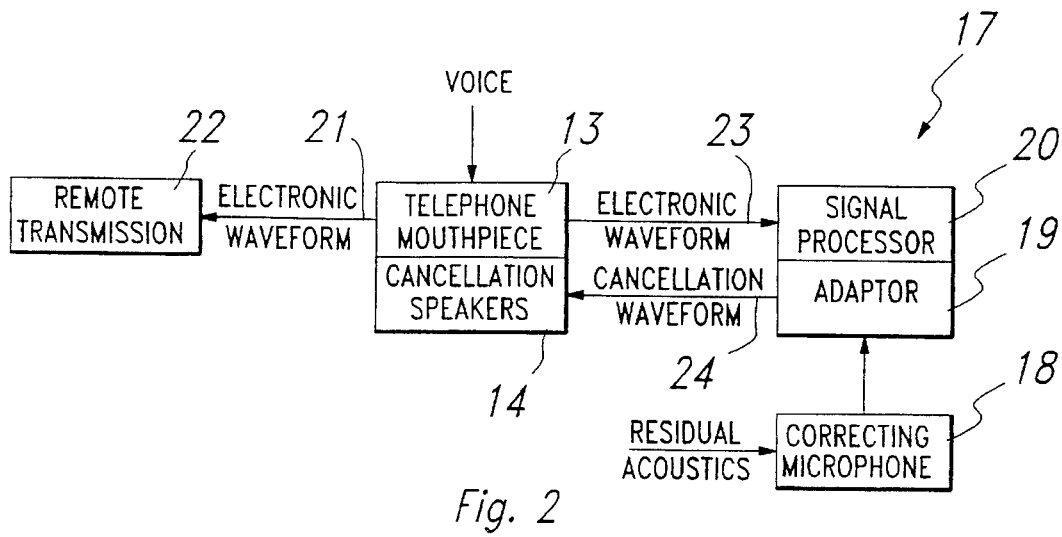
FIG. 2 is a functional block diagram of the system of FIG. 1.

In FIG. 2 the system of FIG. 1 is diagrammed to show that the user's voice enters mouthpiece 13, and the resulting signal is divided into path 21 for remote transmission 22 and path 23 for computer processing by systems 19 and 20 to produce cancellation waveform 24 for activation of speakers 14. Correcting microphone 18 provides an input to system 19 for adaptive correction of waveform 24.

Figure 3:
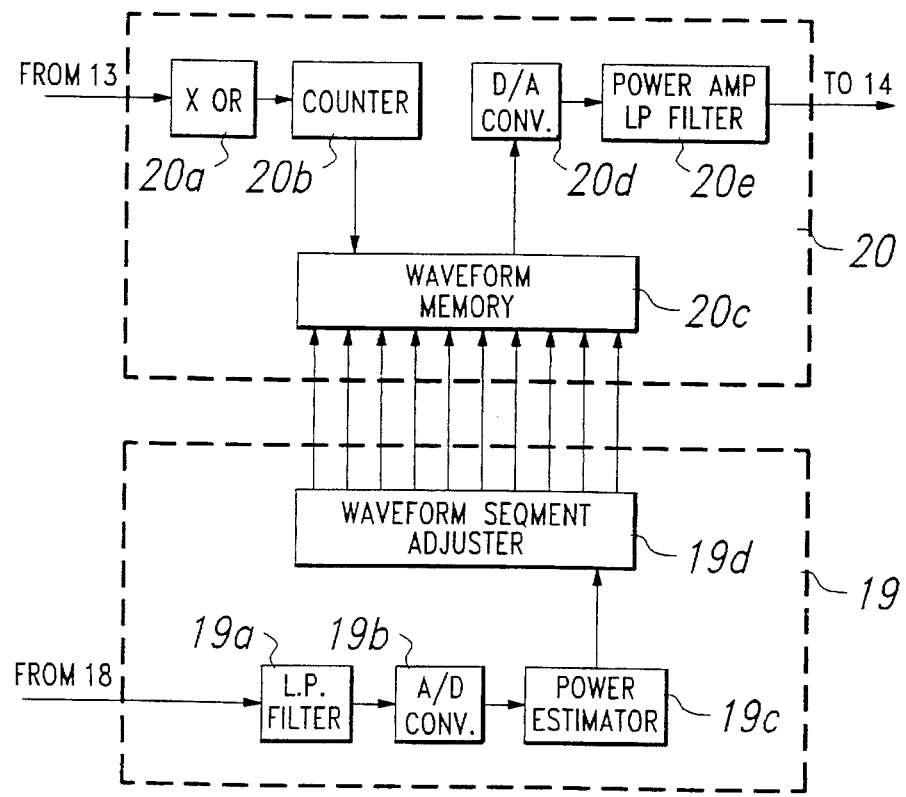
FIG. 3 is a block diagram of the signal processor and adaptor of FIG. 2.

In FIG. 3 systems 19 and 20 are diagrammed to show that the signal from mouthpiece 13 is passed to frequency divider/multiplier 20a and counter 20b, and then to waveform memory 20c which stores a plurality of samples each having a unique address in the memory. These samples represent portions of a precursor of the required waveform, and are presented sequentially to converter 20d to generate the final waveform passed to speakers 14.

The signal from microphone 18 is passed to antialiasing filter 19a and converter 19b, then to power estimator 19c and to segment adjuster 19d, output from which is fed to waveform memory 20c.

Figure 4:
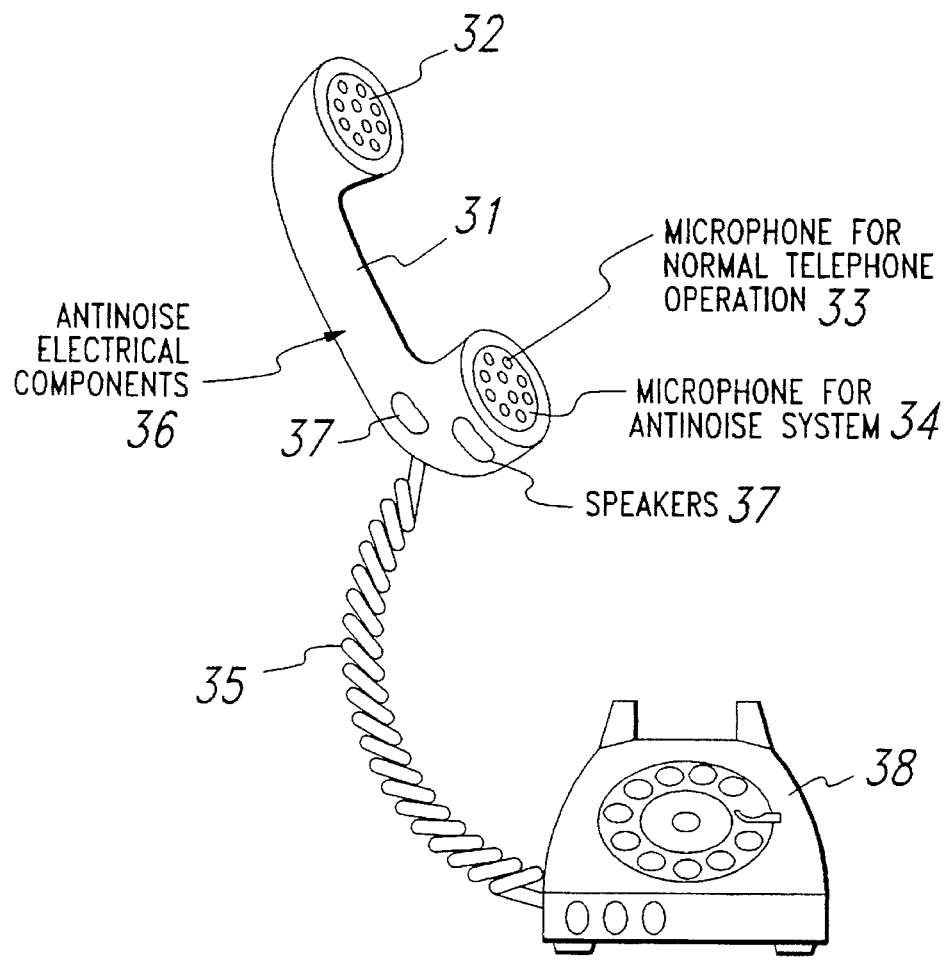
FIG. 4 is a pictorial view of a telephone system illustrating a second embodiment of the invention.

The telephone system of FIG. 4 includes handpiece 31 having an earpiece 32 and a mouthpiece that includes microphone 33 for normal usage, and an additional microphone 34 used only for voice cancellation. The electrical voice signal from microphone 33 is passed through cord 35, base set 38, and to a remote receiver, as in normal telephone usage. The extra microphone 34 generates a separate, identical electrical signal for processing by computer circuitry 36, located in the handpiece.

As in the embodiment of FIG. 1, signal processor 36 generates an active voice cancellation signal, which is passed to one or more speakers 37 for generation of the acoustic wave that cancels the user's voice.

Figure 5:
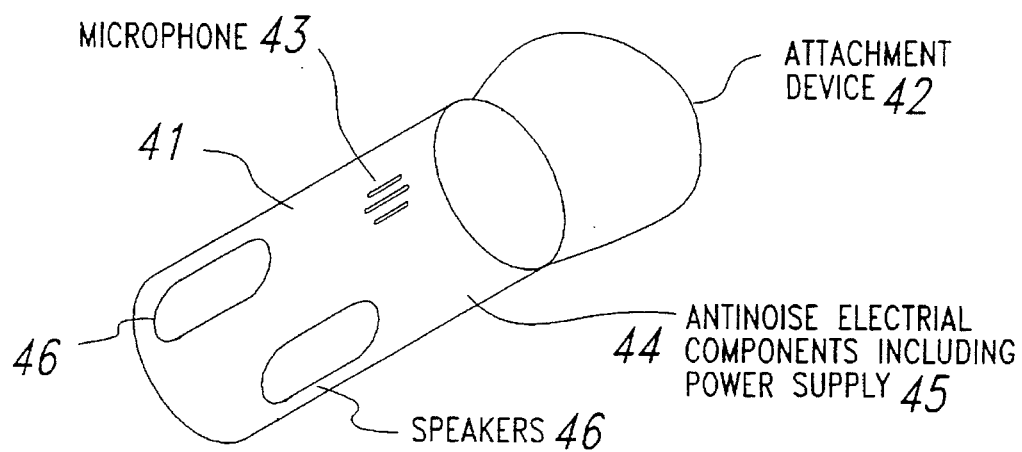
FIG. 5 is a pictorial view of a portable attachment for an existing telephone system, illustrating a third embodiment of the invention.

The portable device of FIG. 5 includes case 41 having a clip or band 42 for temporary attachment of the device to an ordinary telephone. Microphone 43 is mounted within the case, along with voice cancellation circuitry 44, power supply 45, and one or more voice cancellation speakers 46. This device permits the user to "instantly" convert any telephone system to one that includes voice cancellation in accordance with the concept of the present invention. As in the above embodiments, an electrical voice signal from microphone 43 is converted by processor 44 to a mirror-image waveform passed to speaker 46 for use in generating cancellation acoustics.

Further details of noise cancellation, and alternate signal processing options are described in U.S. Pat. No. 4,417,098 and in the following publications, incorporated herein by reference, with copies attached:

Han-Gaul Yeh, "Adaptive Noise Cancellation For Speech With A TMS 32020", International Conference On Acoustics, Speech and Signal Processing, Vol 2, pp 1171–1174, 1987;

Guy Billoud et al, "The Use Of Time Algorithms For The Realization Of An Active Sound Attenuator";

Sen M. Kuo et al, "Adaptive Multi-Channel On-Line Modeling Algorithm for 3-D Active Noise Control Systems", IEEE Industrial Electronics Society, 18th Annual Conference, pp 1331–1335, 1992.

Thus it can be seen that the system of the invention provides the capability of engaging in private conversations by telephone, even when surrounded by people who would otherwise hear every word spoken by the user. This will allow the user to concentrate more fully, and to speak more freely regarding secret information. No training or special effort is needed, since the system works without intervention by the user.

What is claimed is:

1. A telephone system comprising an earpiece and a mouthpiece, said mouthpiece having a transmitter for converting a user's voice to a voice signal, and a speaker adjacent said transmitter, said earpiece having a receiver therein; an adaptive waveform generator coupled to said speaker, and a signal processor for receiving the voice signal generated by said transmitter to create an active cancellation signal for said voice signal, and means for feeding said cancellation signal to said waveform generator whereby said speaker acoustically cancels the sound of a user's voice, just after the generation of said voice signal by said transmitter.

2. A system as in claim 1 wherein said speaker is located in close proximity to said transmitter, with reference to the user's mouth.

3. A telephone system comprising a mouthpiece having first and second microphones therein for converting a user's voice to a voice signal, and a speaker adjacent said microphones; an adaptive waveform generator coupled to said speaker, a signal processor for receiving said voice signal generated by said first microphone, to create an active cancellation signal for said voice signal, and means for feeding said cancellation signal to said waveform generator, whereby said speaker acoustically cancels the sound of a user's voice, just after the generation of a voice signal by said second microphone, for transmission to a remote receiver.

4. A system for enabling a first person to speak into a voice transmission means, without being overheard by other persons nearby, comprising a microphone and active sound cancellation means for attenuating said first person's voice before said voice reaches said other persons, as said first person speaks into said microphone.

5. Apparatus as in claim 4 wherein said cancellation means includes a speaker located near said microphone, said speaker spaced from said microphone to ensure that the user's mouth will be closer to the microphone than to the speaker.

6. Apparatus as in claim 5 further including means for monitoring the signal waveform created by the user's voice, means for generating a signal having a mirror-image waveform, and means for feeding said mirror-image signal to said speaker.

* * * * *